United States Patent

Wu et al.

[11] Patent Number: 5,898,011
[45] Date of Patent: Apr. 27, 1999

[54] HYDROCARBON CONVERSION CATALYST COMPOSITION AND PROCESSES THEREFOR AND THEREWITH

[75] Inventors: An-Hsiang Wu, Bartlesville; Charles A. Drake, Nowata, both of Okla.

[73] Assignee: Phillips Petroleum Company, Bartlesville, Okla.

[21] Appl. No.: 08/919,930

[22] Filed: Aug. 28, 1997

[51] Int. Cl.$^6$ ............................... B01J 29/06; B01J 29/08
[52] U.S. Cl. ............................... 502/60; 502/64; 502/66; 502/327; 502/332; 502/334
[58] Field of Search ............................... 502/60, 64, 66, 502/327, 332, 334

[56] References Cited

U.S. PATENT DOCUMENTS

| | | | |
|---|---|---|---|
| 3,670,044 | 6/1972 | Drehman et al. | |
| 3,674,706 | 7/1972 | Box, Jr. et al. | |
| 4,448,891 | 5/1984 | Cohen | 502/74 |
| 4,458,025 | 7/1984 | Lee et al. | 502/66 |
| 4,507,397 | 3/1985 | Buss | 502/38 |
| 4,517,306 | 5/1985 | Buss | 502/74 |
| 4,614,834 | 9/1986 | Lambert et al. | 585/419 |
| 4,623,632 | 11/1986 | Lambert et al. | 502/74 |
| 4,810,683 | 3/1989 | Cohn et al. | 502/37 |
| 4,822,762 | 4/1989 | Ellig et al. | 502/66 |
| 4,914,068 | 4/1990 | Cross et al. | 502/74 |
| 4,987,109 | 1/1991 | Kao et al. | 502/66 |
| 5,106,800 | 4/1992 | Moser et al. | 502/53 |
| 5,128,300 | 7/1992 | Chao et al. | 502/227 |
| 5,198,597 | 3/1993 | O'Young et al. | 585/654 |
| 5,279,998 | 1/1994 | Mulaskey et al. | 502/74 |
| 5,461,016 | 10/1995 | Bradley et al. | 502/66 |
| 5,464,800 | 11/1995 | Galperin et al. | 502/66 |
| 5,482,910 | 1/1996 | Bricker et al. | 502/300 |
| 5,516,961 | 5/1996 | Miller et al. | 585/660 |
| 5,665,223 | 9/1997 | Bogdan | 208/138 |
| 5,736,478 | 4/1998 | Cortright et al. | 502/74 |

*Primary Examiner*—Elizabeth D. Wood
*Attorney, Agent, or Firm*—Lucas K. Shay

[57] ABSTRACT

A catalyst composition and a process for use in a hydrocarbon conversion process are disclosed. The composition comprises a zeolite and a promoter comprising a Group IVA metal or metal oxide and a Group VIII metal or metal oxide. The process comprises contacting a fluid which comprises a hydrocarbon with the catalyst composition under a condition sufficient to effect the conversion of the hydrocarbon to an olefin. Also disclosed is a process for producing the catalyst composition.

31 Claims, No Drawings

HYDROCARBON CONVERSION CATALYST COMPOSITION AND PROCESSES THEREFOR AND THEREWITH

FIELD OF THE INVENTION

This invention relates to a catalyst composition useful for converting a saturated hydrocarbon to an olefin, a process for producing the composition, and a process for using the composition in a hydrocarbon conversion process.

BACKGROUND OF THE INVENTION

It is well known to those skilled in the art that olefins are a class of very important industrial chemicals which find a variety of uses in petrochemical industry such as, for example, in production of various organic compounds and polymers. Olefins can be produced by several different methods such as, for example, thermal cracking of saturated hydrocarbons and catalytic dehydrogenation of saturated hydrocarbons.

It is conventional in the dehydrogenation of saturated hydrocarbons to utilize catalysts such as platinum, nickel-kieselguhr, chromium oxide-alumina, zinc oxide-alumina, and platinum-alumina. Additionally, a platinum catalyst on a support, with or without oxygen present, is known to be one possible system for the dehydrogenation of paraffin hydrocarbons in the presence of steam.

A process for the dehydrogenation of alkanes, cycloalkanes and arylalkanes can also be carried out over a catalyst composition comprising a Group VIII metal, such as platinum, or a mixture of a Group VIII metal and a Group IVA metal, such as tin. Such catalyst is generally deposited on a support selected from the group consisting of alumina, HF-treated alumina, silica, zinc oxide, magnesia, zirconia, aluminum silicate, and Group IIA and Group IIB aluminate spinels. A dehydrogenation process can be materially improved when the process is conducted in the presence of gaseous hydrogen or mixtures of gaseous hydrogen and gaseous oxygen.

However, in the known processes, the conversion of a saturated hydrocarbon to an olefin and the selectivity thereto are generally not as high as one skilled in the art would desire. Accordingly, there is an ever-increasing need to develop a catalyst and a process for converting a saturated hydrocarbon to the more valuable olefins (hereinafter referred to as hydrocarbon conversion process). Such development would also be a significant contribution to the art and to the economy.

SUMMARY OF THE INVENTION

An object of this invention is to provide a catalyst composition which can be used to convert a saturated hydrocarbon to an olefin. Also an object of this invention is to provide a process for producing the catalyst composition. Another object of this invention is to provide a process which can employ the catalyst composition to convert a saturated hydrocarbon to olefins. An advantage of the catalyst composition is that it exhibits high hydrocarbon conversion activity, satisfactory yield of olefins, and good selectivity. Other objects and advantages will becomes more apparent as this invention is more fully disclosed hereinbelow.

According to a first embodiment of the present invention, a composition which can be used as catalyst for converting a saturated hydrocarbon or a mixture of hydrocarbons containing at least one saturated hydrocarbon to an olefin or a mixture of olefins is provided. The composition is a zeolite having incorporated therein or impregnated thereon a promoter comprising a metal or metal oxide selected from Group VIII metals and optionally at least one metal or metal oxide selected from Group IVA metals. The terms "Group IVA" and "Group VIII" refer to the Periodic Table of the Elements, CRC Handbook of Chemistry and Physics, 67th edition, 1986–1987, CRC Press, Boca Raton, Fla.

According to a second embodiment of the invention, a process for producing a composition which can be used as catalyst in a hydrocarbon conversion process is provided. The process can comprise, consist essentially of, or consist of: (1) optionally contacting a zeolite with a Group IVA metal compound under a condition sufficient to incorporate the Group IVA metal compound into the zeolite to form a modified zeolite; (2) heat-treating the modified zeolite under a condition sufficient to effect the production of a heat-treated zeolite; and (3) contacting the heat-treated zeolite with a Group VIII metal compound under a condition sufficient to incorporate the Group VIII metal compound into the heat-treated zeolite to produce a promoted zeolite.

According to a third embodiment of the present invention, a process which can be used for converting a saturated hydrocarbon or mixture of hydrocarbons to an olefin or a mixture of olefins is provided which comprises, consists essentially of, or consists of, contacting a fluid which comprises a saturated hydrocarbon or mixture of hydrocarbons, optionally in the presence of an inert fluid, with a catalyst composition which can be the same as disclosed above in the first embodiment of the invention under a condition effective to convert a saturated hydrocarbon to an olefin or a mixture of olefins.

DETAILED DESCRIPTION OF THE INVENTION

According to the first embodiment of the invention, a composition which can be used as catalyst in a hydrocarbon conversion process for converting a saturated hydrocarbon to an olefin is provided. As used herein, the term "hydrocarbon" is generally referred to, unless otherwise indicated, as one or more hydrocarbons, saturated or unsaturated, having 2 to about 30 carbon atoms, preferably 2 to about 20 carbon atoms, and most preferably 2 to 16 carbon atoms per molecule. Also preferably, the hydrocarbon is an aliphatic saturated hydrocarbon, a mixture of saturated aliphatic hydrocarbons, or a mixture of saturated aliphatic hydrocarbons and unsaturated hydrocarbons. Examples of hydrocarbons include, but are not limited to, ethane, propanes, butanes, pentanes, heptanes, octanes, nonanes, dodecanes, gasoline, or combinations of two or more thereof. The composition can comprise, consist essentially of, or consist of, a zeolite having incorporated therein, or impregnated thereon, a selectivity-improving amount of a promoter to improve the yield of or selectivity to an olefin when the composition is used in a hydrocarbon conversion process. The term "improving" or "improve" is referred to, unless otherwise indicated, as an increased weight percent of, or percent selectivity to, olefin in the product stream of a hydrocarbon conversion process using a promoted L-zeolite, as compared to using a nonpromoted L-zeolite.

The term "metal" used herein refers to, unless otherwise indicated, both "metal" and "element" of the Periodic Table of the Elements because some elements in the Periodic Table of the Elements may not be considered as metals by those skilled in the art.

According to the first embodiment of the invention, the weight ratio of the promoter to the zeolite can be any ratio so long as the ratio can improve the yield of or selectivity to an olefin in a hydrocarbon conversion process for converting of a hydrocarbon to a an olefin. Generally, the ratio can be in the range of from about 0.0001:1 to about 1:1, preferably about 0.0005:1 to about 1:1, more preferably about 0.0005:1 to about 0.5:1 and most preferably from 0.001:1 to 0.1:1 for an effective hydrocarbon conversion. Alternatively, the promoter can be present in the catalyst composition in the range of from about 0.01 to about 50, preferably about 0.05 to about 50, more preferably about 0.05 to about 30, and most preferably 0.1 to 10 grams per 100 grams of the catalyst composition.

Any promoter that, when incorporated into a zeolite, is capable of improving a hydrocarbon conversion process to an olefin can be employed in the invention. Presently, it is preferred that the promoter comprises at least one Group VIII metal and optionally one or more Group IVA metals. The most preferred Group VIII metal is platinum or an oxide thereof. The most preferred Group IVA metal is tin or an oxide thereof. The oxidation state of the metal can be any available oxidation state. For example, in the case of a platinum or a platinum oxide, the oxidation state of platinum can be 0 (metal only), 2, 4, or combinations of two or more thereof. If a combination of metals or metal oxides is employed, the molar ratio of the second metal or metal oxide, or the third metal or metal oxide, or the fourth metal or metal oxide to the first metal or metal oxide can be in the range of about 0.01:1 to about 100:1.

Any commercially available zeolite which can catalyze the conversion of a hydrocarbon to an aromatic compound and an olefin can be employed in the present invention. Examples of suitable zeolites include, but are not limited to, those disclosed in Kirk-Othmer Encyclopedia of Chemical Technology, third edition, volume 15 (John Wiley & Sons, New York, 1991) and in W. M. Meier and D. H. Olson, "Atlas of Zeolite Structure Types," (Butterworth-Heineman, Boston, Mass., 3rd ed. 1992). Optionally a zeolite can be steam- and/or acid-treated before using the present invention. The presently preferred zeolites are those having large pore size such as, for example, beta zeolite, zeolite X, zeolite Y, and L-zeolite. The presently preferred zeolite is a type L-zeolite.

Type L-zeolites are synthetic zeolites. The atomic ratio of silicon to aluminum in L-zeolites generally vary from about 1.0 to about 3.5.

The composition of the present invention can be prepared by combining a zeolite, a clay, a promoter, and optionally a binder in the weight ratios or percent disclosed above under any conditions sufficient to effect the production of such a composition.

According to the present invention, a zeolite, preferably L-zeolite, a promoter, and optionally a binder can be well mixed at about 15° to about 100° C. under atmospheric pressure, generally in a liquid such as water or a hydrocarbon, by any means known to one skilled in the art such as stirring, blending, kneading, or extrusion, following which the resulting mixture can be dried in air at a temperature in the range of from about 20° to about 800° C., for about 0.5 to about 50 hours under any pressures that can accommodate the temperatures, preferably under atmospheric pressure. Thereafter, the dried, zeolite-binder mixture can be further heat-treated at a temperature in the range of from about 200° to 1000° C., preferably about 250° to about 750° C., and most preferably 350° to 650° C. for about 1 to about 30 hours to prepare the present composition. The heat treatment can be carried out by air calcination or steam.

Generally a zeolite, before a binder is combined with the zeolite, can also be calcined under similar conditions to remove any contaminants, if present, to prepare a calcined zeolite.

A zeolite, whether it has been calcined or contains a binder, can also be treated with steam. The treatment of a zeolite, which can contain a binder, with steam can be carried out in any suitable container or vessel known to one skilled in the art at about 100° C. to about 1000° C. for about 1 to about 30 hours under any pressure that can accommodate the temperatures to produce a steamed zeolite.

A zeolite, whether it has been steamed or not, can be treated with an acid before the preparation of the present composition. Generally, any organic acids, inorganic acids, or combinations of any two or more thereof can be used in the process of the present invention so long as the acid can reduce the aluminum content in the zeolite. The acid can also be a diluted aqueous acid solution. Examples of suitable acids include, but are not limited to, sulfuric acid, hydrochloric acid, nitric acid, phosphoric acid, formic acid, acetic acid, oxalic acid, trifluoroacetic acid, trichloroacetic acid, p-toluenesulfonic acid, methanesulfonic acid, partially or fully neutralized acids wherein one or more protons have been replaced with, for example, a metal (preferably an alkali metal) or ammonium ion, and combinations of two or more thereof. Examples of partially or fully neutralized acids include, but are not limited to, sodium bisulfate, sodium dihydrogen phosphate, potassium hydrogen tartarate, ammonium sulfate, ammonium chloride, ammonium nitrate, and combinations of two or more thereof.

Any methods known to one skilled in the art for treating a solid catalyst with an acid can be used in the acid treatment of the present invention. Generally, a zeolite material, whether or not it contains a binder, or has been steamed, can be suspended in an acid solution. The concentration of the zeolite in the acid solution can be in the range of from about 0.01 to about 700, preferably about 0.1 to about 600, more preferably about 1 to about 550, and most preferably 5 to 500 grams per liter. The amount of acid required is the amount that can maintain the solution in acidic pH during the treatment. Preferably the initial pH of the acid solution containing a zeolite is adjusted to lower than about 7, preferably lower than about 6. Upon the pH adjustment of the solution, the solution can be subjected to a treatment at a temperature in the range of from about 30° C. to about 200° C., preferably about 50° C. to about 150° C., and most preferably 70° C. to 120° C. for about 10 minutes to about 30 hours, preferably about 20 minutes to about 25 hours, and most preferably 30 minutes to 20 hours. The treatment can be carried out under a pressure in the range of from about 1 to about 10 atmospheres (atm), preferably about 1 atm so long as the desired temperature can be maintained. Thereafter, the acid-treated zeolite material can be washed with running water for 1 to about 60 minutes followed by drying, at about 50 to about 1000, preferably about 75 to about 750, and most preferably 100 to 650° C. for about 0.5 to about 15, preferably about 1 to about 12, and most preferably 1 to 10 hours, to produce an acid-leached zeolite. Any drying method known to one skilled in the art such as, for example, air drying, heat drying, spray drying, fluidized bed drying, or combinations of two or more thereof can be used.

The dried, acid-leached zeolite can also be further washed, if desired, with a mild acid solution such as, for example, ammonium nitrate which is capable of maintaining the pH of the wash solution in acidic range. The volume of the acid generally can be the same volume as that disclosed above. The mild acid treatment can also be carried out under substantially the same conditions disclosed in the acid treatment disclosed above. Thereafter, the resulting solid can be washed and dried as disclosed above.

It should be noted that, a zeolite can be acid-leached or -treated before it is treated with steam.

The dried, acid-leached zeolite, whether it has been further washed with a mild acid or not, can be either heated with steam or calcined, if desired, under a condition known to those skilled in the art. Generally such a condition can include a temperature in the range of from about 250 to about 1,000, preferably about 350 to about 750, and most preferably 450° to 650° C. and a pressure in the range of from about 0.5 to about 50, preferably about 0.5 to about 30, and most preferably 0.5 to 10 atmospheres (atm) for about 1 to about 30 hours, preferably about 2 to about 20 hours, and most preferably 3 to 15 hours.

A zeolite, a calcined zeolite, or a calcined zeolite-binder mixture, the process or treatment in the second embodiment is the same for each. For the interest of brevity, only a zeolite is described hereinbelow.

In the second embodiment of the invention, a zeolite or a zeolite-binder mixture, which could have been steamed and/or acid-leached, in a desired ionic form, regardless whether calcined or not, can be combined with a promoter by the process disclosed above for producing zeolite-binder mixture to produce the composition of the invention. The composition can also be produced by contacting a zeolite with a promoter compound, in a solution or suspension, under a condition known to those skilled in the art to incorporate a promoter compound into a zeolite. Because the methods for incorporating or impregnating a promoter compound into a zeolite a solid composition such as, for example, impregnation by incipient wetness method, are well known to those skilled in the art, the description of which is also omitted herein for the interest of brevity.

According to the second embodiment of the invention, a preferred process for producing a zeolite-containing, preferably an L-zeolite-containing, composition comprises, consists essentially of, or consists of: (1) contacting a zeolite with a Group IVA compound under a condition sufficient to incorporate the Group IVA compound into the zeolite to form a modified zeolite; (2) heat-treating the modified zeolite under a condition to effect the production of a heat-treated zeolite; (3) incorporated a Group VIII compound into the heat-treated zeolite to produce a promoted zeolite; and (4) calcining or steaming the promoted zeolite.

Generally, in the first step of the process of the preferred process of the second embodiment of the invention, a zeolite can be combined with a Group IVA (metal) compound in any suitable weight ratios which would result in the weight ratios of a metal or metal oxide to zeolite disclosed in the first embodiment of the invention. Presently it is preferred that such combination be carried out in a suitable liquid, preferably an aqueous medium, to form an incipient wetness zeolite-metal compound mixture. The combining of a zeolite and a Group IVA compound can be carried out at any temperature. Generally, the temperature can be in the range of from about 15° C. to about 100° C., preferably about 20° C. to about 100° C., and most preferably 20° C. to 60° C. under any pressure, preferably atmospheric pressure, for any length so long as the metal compound and the zeolite are well mixed, generally about 1 minute to about 15 hours, preferably about 1 minute to about 5 hours.

Any Group IVA compounds can be used in the first step of the preferred process of the second embodiment. Examples of suitable tin compound include, but are not limited to, tri-n-butyltin acetate, n-butyltin trichloride, di-n-butyldiphenyltin, di-n-butyltin diacetate, di-n-butyltin dichloride, di-t-butyltin dichloride, di-n-butyltin dilaurate, dimethyldiphenyltin, diphenyltin dichloride, hexa-n-butylditin, hexamethylditin, hexaphenylditin, methyltin trichloride, phenyltin trichloride, tetra-n-butyltin, tetraethyltin, tetramethyltin, tetraphenyltin, tetra-i-propyltin, tetra-n-propyltin, tin acetate, tin bromide, tin chloride, tin oxalate, tin sulfate, tin sulfide, and combinations of any two or more thereof. The presently preferred tin compound is tri-n-butyltin acetate.

Examples of suitable germanium-containing compounds include, but are not limited to, germanium chloride, germanium bromide, germanium ethoxide, germanium fluoride, germanium iodide, germanium methoxide, and combinations of any two or more thereof.

Upon completion of incorporating a Group IVA compound into a zeolite, a modified zeolite is formed. In the next step of the process, the modified zeolite is subject to a heat treatment. The heat treatment can be air calcining or steam. Air calcining can be carried out under a condition sufficient to convert a metal compound to its oxide form and can include a temperature in the range of from about 300° C. to about 1000° C., preferably about 350° C. to about 750° C., and most preferably 400° C. to 650° C. under a pressure in the range of from about 1 to about 10, preferably about 1 atmospheres for a period in the range of from about 1 to about 30, preferably about 1 to about 20, and most preferably 1 to 15 hours.

Steam treatment can be carried out under a suitable condition sufficient to effect the conversion of a Group IVA compound, which have been incorporated into the modified zeolite, to its corresponding oxide form. The modified zeolite can be air dried to remove most moisture content before being steam-treated. Air drying can be carried out at a temperature for about 25° C. to about 150 ° C. for about 1 minute to about 30 hours under any effective pressure that can maintain the necessary temperature. The air-dried modified zeolite can then be treated with a steam. Generally the steam temperature can be in any suitable vessel and in the range of from about 120° C. to about 1500° C., preferably about 200° C. to about 1200° C., and most preferably 250° C. to 1000° C. The treatment period can be as short as 5 minutes to as long as about 30 hours so long as it is sufficient to convert the metal compound to its oxide form. The treatment can be carried out under a pressure which can maintain the required temperature and can be in the range of from about atmospheric pressure to about 2,000, preferably to about 1,500, and most preferably to 1000 psig.

Upon completion of heat treatment, a heat-treated zeolite is produced which can then be contacted, generally mixed, with a Group VIII compound. The contacting of a zeolite with a Group VIII compound can be carried out under a condition that is sufficient to effect the incorporation of the Group VIII compound into the zeolite. Generally the condition can be the same as that disclosed above for contacting a zeolite with a Group IVA compound. In this step, a promoted zeolite is produced. The promoted zeolite can then be subject to a heat treatment as described to produce the composition of this invention.

Any Group VIII compound can be used in the present invention. The presently preferred Group VIII compound is a platinum compound. Generally, any platinum compound that can promote the combining of platinum element with a zeolite can be employed herein. Examples of suitable platinum compounds include, but are not limited to, chloroplatinic acid ($H_2PtCl_6 \cdot xH_2O$), platinum chloride (platinic chloride), platinum bromide, platinum iodine, tetramine platinum chloride ($Pt(NH_3)_4Cl_2 \cdot H_2O$ or $Pt(NH_3)_4Cl_2$), tetramine platinum nitrate ($Pt(NH_3)_4(NO_3)_2$), tetramine platinum hydroxide ($Pt(NH_3)_4(OH)_2$), tetrachlorodiamine platinum, and combinations of any two or more thereof. The oxidation state of platinum in the above-illustrated platinum compound can be any available oxidation state. The presently preferred platinum compound is chloroplatinic acid for it is readily available.

Examples of other suitable Group VIII compounds include, but are not limited to, cobalt(II) acetate cobalt acetylacetonate, cobalt acetylacetonate, cobalt benzoylacetonate, cobalt bromide, cobalt carbonate, cobalt chloride, cobalt 2-ethylhexanoate, cobalt fluoride cobalt fluoride, cobalt iodide, cobalt iodide, cobalt 2,3-naphthalocyanine, cobalt nitrate, cobalt oxalate, cobalt perchlorate, cobalt phthalocyanine, cobalt sulfate, cobalt thiocyanate, cobalt tungstate, nickel acetate, nickel acetylacetonate, nickel bromide, nickel carbonate, nickel chloride, nickel nitrate, nickel perchlorate, nickel phosphide, nickel sulfate, nickel sulfide, nickel titanate, palladium acetate, palladium acetylacetonate, palladium bromide, palladium iodide, palladium nitrate, palladium sulfate, palladium sulfide, rhodium acetate, rhodium acetylacetonate, rhodium bromide, rhodium chloride, rhodium nitrate, rhodium octanoate, rhodium phosphate, rhodium sulfate, rhenium nitrate, rhenium sulfate, and combinations of any two or more thereof.

The composition of the invention then can be, if desired, pretreated with a reducing agent before being used in a hydrocarbon conversion process. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours.

According to the third embodiment of the present invention, a process useful for converting a hydrocarbon to an olefin comprises, consists essentially of, or consists of contacting a fluid stream comprising a saturated hydrocarbon or a mixture of saturated hydrocarbons and, optionally, in the presence of an inert fluid with a catalyst composition under a condition sufficient to effect the conversion of a saturated hydrocarbon to an olefin. The inert fluid can be hydrogen, nitrogen, helium, argon, carbon dioxide, neon, steam, and combinations of any two or more thereof. The presently preferred inert fluid is a hydrogen-containing fluid. The inert fluid can also be fed separately into contact with a hydrocarbon and a catalyst. The catalyst composition is the same as that disclosed in the first embodiment of the invention. The term "fluid" is used herein to denote gas, liquid, vapor, or combinations of two or more thereof.

Any hydrogen-containing fluid which comprises, consists essentially of, or consists of, molecular hydrogen ($H_2$) can be used in the process of this invention. This hydrogen-containing fluid can therefore contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of any two or more thereof, or any other fluid which does not significantly affect the process or the catalyst composition used therein.

Any fluid which contains a saturated hydrocarbon as disclosed above can be used as the feed for the process of this invention. Generally, the fluid feed stream can also contain olefins, naphthenes (cycloalkanes), or some aromatic compounds.

The contacting of a fluid feed stream containing a saturated hydrocarbon with the catalyst composition can be carried out in any technically suitable manner, in a batch or semicontinuous or continuous process, under a condition effective to convert an aliphatic hydrocarbon to an olefin. Generally, a fluid stream as disclosed above, preferably being in the vaporized state, is introduced into a suitable reactor having a fixed catalyst bed, or a moving catalyst bed, or a fluidized catalyst bed, or combinations of two or more thereof by any means known to one skilled in the art such as, for example, pressure, meter pump, and other similar means. Because a hydrocarbon conversion reactor is well known to one skilled in the art, the description of which is omitted herein for the interest of brevity. The condition can include a weight hourly space velocity (WHSV) of the fluid stream in the range of about 0.01 to about 100, preferably about 0.05 to about 50, and most preferably 0.1 to 30 g feed/g catalyst/hour. The gas hourly space velocity can be in the range of from about 0.01 to about 5000 $ft^3/ft^3$ catalyst/hour. Generally, the pressure can be in the range of from about 0 to about 1000 psig, preferably about 0 to about 200 psig, and most preferably 0 to 50 psig, and the temperature is about 250° to about 1000° C., preferably about 350° to about 750° C., and most preferably 450° to 650° C.

The process effluent or product stream generally contains the desired olefins which can be separated by any known methods such as, for example, distillation or fractionation distillation. Because the separation methods are well known to one skilled in the art, the description thereof is omitted herein.

After the catalyst composition has been deactivated by, for example, coke deposition or feed poisons, to an extent that the feed conversion and/or the selectivity to the desired olefins have become unsatisfactory, the catalyst composition can be reactivated by any means known to one skilled in the art such as, for example, calcining in air to burn off deposited coke and other carbonaceous materials, such as oligomers or polymers, preferably at a temperature of about 400° to about 650° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention using n-butane as hydrocarbon feed and are not to be construed as unduly limiting the scope of the present invention. The examples illustrate the preparation of catalyst compositions of the invention and the use of the composition in a hydrocarbon conversion process.

EXAMPLES

An L-zeolite obtained from CU Chemie Uetiken, Uetikon, Switzerland having the product designation of Zeocat L-zeolite was used to produce various composition for test runs. Zeocat L-zeolite contained the following elements, obtained by XRF, in weight %: Na, 0.68; Al, 6.80; Si 21.70; K, 9.00; and Mg, 0.31. The zeolite also contained 30 weight % alumina as binder.

First, 10.91 g of the zeolite was well mixed at 25° C. with 4.67 g of an acetone solution which contained 1.0 weight % chloroplatinic acid ($H_2PtCl_6 \cdot xH_2O$ or CPA) and 1 weight % tri-n-butyltin acetate to impregnate both tin and platinum onto the zeolite. The resulting mixture was extruded to 1/16 inch extrudates and then calcined at 538° C. for 6 hours in a muffle furnace (air) to produce 10.36 g of a calcined platinum-tin-promoted zeolite or Pt-Sn/zeolite containing 0.171 weight % platinum and 0.153 weight % tin by calculation (catalyst A).

Secondly, 21.0 g of the L-zeolite was treated with 11.11 g of a solution containing 1 weight % CPA, 0.5 weight % $SnCl_2 \cdot 2H_2O$, 9.85 weight % HCl, and 88.65 weight % $H_2O$ under incipient wetness condition to impregnate CPA and tin chloride onto the zeolite followed by calcination at 538° C. for 6 hours to produce 19.97 g of a platinum-tin-promoted zeolite (catalyst B) containing 0.211 weight % of platinum and 0.146 weight % tin by calculation.

Thirdly, 5 g of the L-zeolite was well mixed with 1.95 g of a 1.0 weight % tri-n-butyltin acetate solution (in cyclohexane) in a jar at 25° C. to impregnate tri-n-butyltin acetate onto the zeolite followed by air drying at 25° C. to no apparent excess moisture. The resulting mixture in a U-tube was treated with steam at 650° C. for 6 hours to produce 4.72 g of steamed product which was subsequently treated with 2.89 g of a 1.0 weight % CPA solution in 1 weight % HCl to impregnated CPA onto the zeolite. After being calcined at 538° C. for 1 hour, 4.47 g of platinum and tin-incorporated zeolite containing 0.140 weight % tin and 0.246 weight % platinum by calculation (catalyst C) was produced. Catalyst C had a Sn:Pt atomic ratio of 0.935.

In a separate run, 5 grams of the L-zeolite was well mixed with 1.95 g of the 1 weight % tri-n-butyltin acetate solution (in cyclohexane) to impregnate tin onto the zeolite followed by calcination for 6 hours at 538° C. to produce a calcined product which was subsequently treated with 2.83 g of CPA solution described above for catalyst C production to produce 4.57 g of platinum and tin-promoted zeolite (catalyst D). Catalyst D contained 0.137 weight % tin and 0.235 weight % platinum by calculation (Sn/Pt=0.958).

Catalyst E was a catalyst produced by the process disclosed in U.S. Pat. No. 3,670,044, Example I except that the platinum and tin content of catalyst E were: 0.6 weight % platinum and 1.2 weight % tin. The disclosure of the U.S. Pat. No. 3,670,044 is incorporated herein by reference.

These zeolite compositions were then employed, according to the third embodiment of the invention, in a hydrocarbon conversion process for converting a hydrocarbon feed to an olefin. The feed in these runs was n-butane.

A stainless-steel reactor tube (inner diameter 0.75 inch; length 20 inches) was filled with a 20 ml bottom layer of Alundum® zeolite (inert, low surface area zeolite), one of the catalysts (in 1/16 inch extrudates) in the center position 5 ml, and a 20 ml top layer of Alundum® zeolite. The catalysts were pretreated with hydrogen (33 ml/minute) at 550° C. (starting at 25° C. then ramping at 10° C./min) for one hour. The feed was then introduced into the reactor at a rate of about 6 liters/hour. Hydrogen was introduced into the runs with catalysts A, C, and D resulting in the mole ratio of $H_2$/n-butane of 2.787, 0.223, and 0.203 for catalyst A, catalyst C, and catalyst D, respectively. No hydrogen was employed in the run with catalyst B. The reaction temperature was 545° C. to 552° C. and the reaction pressure was 15 psig. The reactor effluent was cooled and analyzed with an on-line gas chromatograph at intervals of about 1 hour. The results at 5.92 hours (catalyst A), 6.23 hours (catalyst B), 6.12 hours (catalyst C) and 5.65 hours (catalyst D) after the start of reaction are shown in Table I.

TABLE I

| Catalyst | Wt % Composition | | % Conv. | Wt % Product | | Selectivity | |
|---|---|---|---|---|---|---|---|
| | Pt | Sn | n-$C_4$ | $C4='s$ | n-$C4=$ | $C4=$ | $C4='s$ |
| A | 0.171 | 0.153 | 24.34 | 21.67 | 21.18 | 0.977 | 0.890 |
| B | 0.211 | 0.146 | 20.67 | 17.15 | 16.77 | 0.978 | 0.830 |
| C | 0.246 | 0.140 | 21.18 | 19.72 | 19.66 | 0.997 | 0.931 |
| D | 0.235 | 0.137 | 21.14 | 18.35 | 18.27 | 0.996 | 0.868 |
| E | 0.60 | 1.20 | 13.22 | 12.17 | 12.17 | 1.000 | 0.921 |

Table I shows that platinum- and tin-supported zeolite catalysts, as compared to a platinum supported zeolite catalyst, required lower platinum loading and had higher catalytic activity. Table I further shows that steam treatment of a tin-impregnated zeolite followed by platinum impregnation (catalyst C) had better n-butene selectivity than the catalysts produced by co-impregnation of tin and platinum (catalysts A and B) as well as the catalyst produced by air calcining a tin-impregnated zeolite followed by platinum impregnation (catalyst D). The results in table I further show that the invention catalysts, when compared to an alumina-based catalyst (catalyst E), had better n-butane conversion and comparable n-butene selectivity to catalyst E. However, the invention catalyst had only about 40% or less Pt loading and less than 10% Sn loading than the alumina-based catalyst (E).

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A composition comprising a zeolite having incorporated therein a promoter which comprises at least one Group VIII metal or metal oxide and at least one Group IVA metal or metal oxide wherein the atomic ratio of said Group IVA metal to said Group VIII metal or the atomic ratio of said metal of Group IVA metal oxide to said metal of Group VIII metal oxide is less than 1.

2. A composition according to claim 1 wherein said zeolite is L-zeolite.

3. A composition according to claim 2 wherein said Group VIII metal or metal oxide is selected from the group consisting of platinum, platinum oxides, and combinations of two or more thereof.

4. A composition according to claim 2 wherein said Group IVA metal or metal oxide is selected from the group consisting of tin, tin oxides, and combinations of two or more thereof.

5. A composition according to claim 1 wherein said composition is L-zeolite having impregnated thereon platinum and tin.

6. A composition according to claim 2 wherein the weight ratio of said promoter to said L-zeolite is in the range of from about 0.0001:1 to about 1:1.

7. A composition according to claim 2 wherein the weight ratio of said promoter to said L-zeolite is in the range of from 0.001:1 to 0.1:1.

8. A composition according to claim 5 wherein the weight ratio of said promoter to said L-zeolite is in the range of from 0.001:1 to 0.1:1.

9. A composition according to claim 2 wherein the weight % of said promoter in said composition is in the range of from about 0.01 to about 50%.

10. A composition according to claim 2 wherein the weight % of said promoter in said composition is in the range of from 0.1 to 10%.

11. A composition according to claim 5 wherein the weight % of said promoter in said composition is in the range of from 0.1 to 10%.

12. A composition according to claim 1 wherein said catalyst composition consists essentially of an L-zeolite, a Group IVA metal or metal oxide, and a group VIII metal or metal oxide.

13. A composition according to claim 12 wherein said Group IVA metal is tin and said Group VIII metal is platinum; and the weight % of (platinum+tin) in said composition is in the range of from 0.1 to 10%.

14. A process comprising: (1) contacting an L-zeolite with a solution consisting essentially of a Group IVA compound to produce a modified L-zeolite; (2) heat-treating said modified L-zeolite with steam under a condition sufficient to convert said Group IVA compound to its corresponding oxide to form a heat-treated L-zeolite; and (3) contacting said heat-treated L-zeolite with a solution consisting essentially of a Group VIII compound under a condition sufficient to incorporate said Group VIII compound into said heat-treated L-zeolite to form a promoted L-zeolite.

15. A process according to claim 14 further comprising the step of: (4) heat-treating said promoted L-zeolite.

16. A process according to claim 14 wherein said group IVA compound is selected from the group consisting of tri-n-butyltin acetate, n-butyltin trichloride, di-n-butyldiphenyltin, di-n-butyltin diacetate, di-n-butyltin dichloride, di-t-butyltin dichloride, di-n-butyltin dilaurate, dimethyldiphenyltin, diphenyltin dichloride, hexa-n-butylditin, hexamethylditin, hexaphenylditin, methyltin trichloride, phenyltin trichloride, tetra-n-butyltin, tetraethyltin, tetramethyltin, tetraphenyltin, tetra-i-propyltin, tetra-n-propyltin, tin acetate, tin bromide, tin chloride, tin oxalate, tin sulfate, tin sulfide, and combinations of two or more thereof.

17. A process according to claim 14, wherein said Group VIII compound is selected from the group consisting of chloroplatinic acid, platinum chloride (platinic chloride), platinum bromide, platinum iodine, tetramine platinum chloride, tetramine platinum nitrate, tetramine platinum hydroxide, tetrachlorodiamine platinum, and combinations of two or more thereof.

18. A process according to claim 14 wherein said Group IVA compound is a tin compound.

19. A process according to claim 14 wherein said Group VIII compound is a platinum compound.

20. A process according to claim 15 wherein said Group VIII compound is a platinum compound.

21. A process according to claim 15 wherein said Group IVA compound is selected from the group consisting of tri-n-butyltin acetate, n-butyltin trichloride, di-n-butyldiphenyltin, di-n-butyltin diacetate, di-n-butyltin dichloride, di-t-butyltin dichloride, di-n-butyltin dilaurate, dimethyldiphenyltin, diphenyltin dichloride, hexa-n-butylditin, hexamethylditin, hexaphenylditin, methyltin trichloride, phenyltin trichloride, tetra-n-butyltin, tetraethyltin, tetramethyltin, tetraphenyltin, tetra-i-propyltin, tetra-n-propyltin, tin acetate, tin bromide, tin chloride, tin oxalate, tin sulfate, tin sulfide, and combinations of two or more thereof, and said Group VIII compound is selected from the group consisting of chloroplatinic acid, platinum chloride (platinic chloride), platinum bromide, platinum iodine, tetramine platinum chloride, tetramine platinum nitrate, tetramine platinum hydroxide, tetrachlorodiamine platinum, and combinations of two or more thereof.

22. A process according to claim 21 wherein said Group VIII compound is chloroplatinic acid and Group IVA compound is tri-n-butyltin.

23. A process comprising: (1) contacting an L-zeolite with an impregnating solution consisting essentially of a Group IVA compound to produce a modified L-zeolite; (2) heat-treating said modified L-zeolite with steam under a condition sufficient to convert said Group IVA compound to its corresponding oxide to form a heat-treated L-zeolite; and (3) contacting said heat-treated L-zeolite with an impregnating solution consisting essentially of a Group VIII compound under a condition sufficient to incorporate said Group VIII compound into said heat-treated L-zeolite to form a promoted L-zeolite; and (4) heat-treating said promoted L-zeolite wherein said Group IVA compound is selected from the group consisting of tri-n-butyltin acetate, n-butyltin trichloride, di-n-butyldiphenyltin, di-n-butyltin diacetate, di-n-butyltin dichloride, di-t-butyltin dichloride, di-n-butyltin dilaurate, dimethyldiphenyltin, diphenyltin dichloride, hexa-n-butylditin, hexamethylditin, hexaphenylditin, methyltin trichloride, phenyltin trichloride, tetra-n-butyltin, tetraethyltin, tetramethyltin, tetraphenyltin, tetra-i-propyltin, tetra-n-propyltin, tin acetate, tin bromide, tin chloride, tin oxalate, tin sulfate, tin sulfide, and combinations of two or more thereof; and said Group VIII compound is selected from the group consisting of chloroplatinic acid, platinum chloride (platinic chloride), platinum bromide, platinum iodine, tetramine platinum chloride, tetramine platinum nitrate, tetramine platinum hydroxide, tetrachlorodiamine platinum, and combinations of two or more thereof.

24. A process according to claim 23 wherein said Group IVA compound is a tin compound and said Group VIII compound is a platinum compound.

25. A process according to claim 23 wherein said Group IVA compound is tri-n-butyltin acetate and said Group VIII compound chloroplatinic acid.

26. A process comprising: (1) contacting an L-zeolite with an impregnating solution consisting essentially of a tin compound to produce a modified L-zeolite; (2) heat-treating said modified L-zeolite with steam under a condition sufficient to convert said tin compound to a tin oxide to form a heat-treated L-zeolite; and (3) contacting said heat-treated L-zeolite with an impregnating solution consisting essentially of a platinum compound under a condition sufficient to incorporate said platinum compound into said heat-treated L-zeolite to form a promoted L-zeolite; and (4) heat-treating said promoted L-zeolite.

27. A process according to claim 26 wherein said tin compound is tri-n-butyltin.

28. A process according to claim 26 wherein said platinum compound is chloroplatinic acid.

29. A process according to claim 27 wherein said platinum compound is chloroplatinic acid.

30. A process according to claim 29 wherein said heat-treating in step (4) is carried out by air calcination.

31. A process according to claim 29 wherein said heat-treating in step (4) is carried out by steam.

* * * * *